United States Patent [19]

Everett et al.

[11] Patent Number: 6,069,607
[45] Date of Patent: May 30, 2000

[54] MULTI-FORMAT ON-SCREEN MONITOR

[75] Inventors: Mark J. Everett, Pottstown, Pa.;
Kenneth J. Michel, Brightwaters, N.Y.;
Richard R. Hollowbush, Fleetwood,
Pa.; Matthew J. Washko, Pottstown,
Pa.; Michael L. Richardson, Reading,
Pa.; Philip L. Leifer, Lansdale, Pa.

[73] Assignee: Videotek, Inc., Pottstown, Pa.

[21] Appl. No.: 08/950,451

[22] Filed: Oct. 15, 1997

[51] Int. Cl.[7] .................................................. G09G 5/36
[52] U.S. Cl. ........................ 345/133; 345/134; 348/185
[58] Field of Search .................................. 345/133, 134, 345/135, 327; 348/554, 555, 177, 185

[56] References Cited

U.S. PATENT DOCUMENTS

| 4,811,097 | 3/1989 | Ritter et al. | 358/160 |
|---|---|---|---|
| 5,046,030 | 9/1991 | Bitter et al. | 364/571.02 |
| 5,097,257 | 3/1992 | Clough et al. | 340/814 |
| 5,122,863 | 6/1992 | Zortea | 358/10 |
| 5,166,779 | 11/1992 | Moyer | 358/10 |
| 5,166,791 | 11/1992 | Crawford | 358/10 |
| 5,231,475 | 7/1993 | Ritter et al. | 358/22 |
| 5,469,188 | 11/1995 | Krishnamurthy et al. | 345/117 |
| 5,473,382 | 12/1995 | Nohmi et al. | 348/448 |
| 5,537,157 | 7/1996 | Washino et al. | 348/554 |
| 5,553,140 | 9/1996 | Kubota et al. | 348/554 |
| 5,737,032 | 4/1998 | Stenzel et al. | 348/649 |
| 5,856,930 | 1/1999 | Hosono | 345/327 |
| 5,926,228 | 7/1999 | Jeon et al. | 348/555 |

FOREIGN PATENT DOCUMENTS 0 336 594 A3  10/1989  European Pat. Off. .
2 183 420   6/1987  United Kingdom .

OTHER PUBLICATIONS

Videotek VTM–100 Brochure, 1994.
Videotek VTM100D Brochure, 1995.
Tektronix WVR 500 Waveform/Vector Rasterizer Brochure (Web Page), pp. 1–6, Apr. 1996.
MAGNI MN–400 Brochure, 1993.
MAGNI WVM–710A/720 Brochure, Nov. 1195.
http://www.chinatenders.com/example/jinci/ifba.htm. (Mar. 26, 1997) See item 2–1–4: "PAL waveform and vector monitor".
http://www.videotek.com/test.html. (Sep. 16, 1998). See whole document.

*Primary Examiner*—Amare Mengistu
*Attorney, Agent, or Firm*—Duane, Morris & Heckscher; Stephan Gribok

[57] ABSTRACT

An audio-video signal processor for use with a standard non-interlaced computer monitor has at least one video input for receiving an analog or digital input signal. The signal processor generates a resized non-interlaced video image, graphic video waveform and vector diagram based on the video input signal. Analog and digital stereo audio is also processed, and preferably bar graphs including audio level and phase data are displayed based on the audio input signal. The signal processor simultaneously displays the resized non-interlaced video image, graphic video waveform, vector diagram and audio graphic display in progressive scan format, each in a portion of the standard non-interlaced computer monitor.

13 Claims, 10 Drawing Sheets

MULTI-FORMAT ON-SCREEN MONITOR

BACKGROUND OF THE INVENTION

1. Field of the Invention

The invention relates to the field of video and audio signal monitoring and test equipment, and in particular concerns a signal processor with two analog composite video inputs, two serial digital video inputs (compliant with ITU-R BT.601 SMPTE 259M standards at 270 Mb/s, 50 Hz and 60 Hz field rates, also called CCIR 601) as well as two stereo analog audio inputs. The signal processor is operable selectively and/or simultaneously to display video images, graphic video waveform information, graphic vector data and audio information in high resolution form. The invention is useful in connection with graphics production, mixed format and video production and post production facilities, and can replace two waveform monitors, two vectorscopes, an audio test set and two standard video monitors.

2. Prior Art

Standard video signals are generally displayed on either television sets or composite video monitors in color or black and white. For color, the standard color composite video signal is an analog signal that electrically represents the brightness or luminance, saturation and color hue or chrominance of a complete video picture or frame, divided into sequential individual picture elements (pixels) of a raster scanned display. A pixel is the smallest discrete area of a television or video picture, each including adjacent red, blue and green phosphors. In addition, the signal includes synchronizing information associated with controlling raster scanning, such as blanking and maintaining the correct phase relationship between the signal and deflection of the electron beam for scanning accurately over the respective colored parts of the successive pixels.

Monitors compliant with various video standards such as NTSC, PAL and SECAM are available and display a video image in an interlaced format having specific timing. For example, an NTSC compliant composite video signal is displayed with 525 lines per frame at 30 frames per second. Each frame is composed of two interlaced fields of 262.5 lines completed at a field rate of 59.94 Hz.

Three basic types of synchronizing information are contained in the signal, namely horizontal sync pulses at the line rate, vertical sync pulses at field rate and a color burst during horizontal blanking. The color burst typically controls a phase locked loop and provides a frequency and phase reference for correctly decoding the color information by illuminating the correct colored phosphors with the cathode ray electron beam at the correct time.

Video production equipment advantageously includes various forms of video and audio signal monitoring and measurement equipment useful to verify the integrity of the signal being processed, for example for adjusting equipment to certain standards when processing a test pattern or for generally monitoring characteristics of the program. The composite graphic video waveform can be viewed graphically, for example, using an oscilloscope triggered by the horizontal sync to provide a two dimensional representation of the video signal in Cartesian coordinates (X axis—time, Y axis—amplitude) when processing a test pattern having vertical color bars. Alternatively a modified oscilloscope with specific time bases and amplitude scales is used.

The color content of the video signal is represented by phase relationship to the subcarrier synchronized to the color burst. Accordingly, color information is advantageously displayed graphically in a polar plot using a vectorscope. A vectorscope is generally a specialized oscilloscope operable to display a Lissajous pattern in which both the X and Y axis of the display represent luminance information (e.g., red minus luminance plotted against blue minus luminance). The vectorscope is useful in setting or monitoring timing, phase and amplitude parameters of a video signal to match standard color test patterns.

Audio information which accompanies a television video signal is generally displayed on moving needle galvanometers or LED bar displays with scales calibrated in dB.

Test instruments such as the Videotek VTM-100, VTM-100D and the Tektronix WVR500 provide for the simultaneous display of video image information, waveform, vector and audio graphic display information in interlaced format on an NTSC or PAL monitor. The use of standard interlaced displays for simultaneous display of such information severely limits the clarity and detail of the video images, rasterized waveforms, vectorscope and audio graphic display information. It would be desirable to provide a simple and efficient means to display video images, waveforms, vectorscope and audio graphic display information with increased clarity and detail, and preferably selectively and simultaneously.

SUMMARY OF THE INVENTION

It is an object of the invention to provide an audio-video processor operable to display video images, waveform, vector and audio information in high resolution form, preferably simultaneously in quadrants of a standard computer monitor display.

It is an another object of the invention to provide an audio-video processor operable to display video images, waveform, vector and audio information on a standard computer monitor without the need for processing the data by computer, and at high resolution and high data rate.

It is another object of the invention to provide an audio-video processor operable to digitize composite video signals utilizing 24-bit color representation (16,777,216 colors) and to display the digitized video signal on a standard SVGA computer monitor in full screen, full motion 640 pixel per line by 480 line per frame format.

It is another object of the invention to provide an audio-video processor operable to display waveforms, vectorscope and audio graphic display information on a standard SVGA computer monitor in full screen format.

It is another object of the invention to provide an audio-video processor operable to digitize composite video signals utilizing 24-bit color representation and to display the digitized video signal in one quadrant of a standard SVGA computer monitor (800 by 600 pixels) in full motion 400 pixel per line by 300 line per frame format.

It is another object of the invention to provide an audio-video processor operable to digitize and represent a video signal, waveform, vector and audio graphic display information such as a bar graph on a standard SVGA computer monitor each displayed in a quadrant of the standard SVGA computer monitor.

These and other objects are accomplished by an audio-video signal processor with two analog composite video inputs, two serial digital video inputs (compliant with ITU-R BT.601 and SMPTE 259M standards at 270 Mb/s, 50 Hz and 60 HZ field rates) as well as two stereo analog or digital audio inputs. The processor controls simultaneously display of video images, waveform, vector and audio information in high resolution form, each in a quadrant of standard computer monitor. The invention is useful in connection with graphics, mixed format and video production and post production facilities including broadcasting, and serves all the functions of two waveform monitors, two vectorscopes, an audio test set and two standard video monitors, providing substantial cost reduction and increased convenience.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is block diagram of the video input circuitry in accordance with the invention.

FIG. 2 is a block diagram of circuitry for generating and outputting a non-interlaced video image in accordance with the invention.

DETAILED DESCRIPTION OF THE PREFERRED EMBODIMENTS

The invention comprises a signal processor with analog video inputs for analog video input signals in both NTSC and PAL formats, serial digital video inputs for serial digital input signals, as well as analog and digital audio inputs for standard analog and AES/EBU digital audio input signals. The serial digital video inputs are compliant with ITU-R BT.601 (formerly known as CCIR 601) and SMPTE 259M standards which define the sampling systems, matrix values, and filter characteristics for both Y, B-Y, R-Y and RGB component digital television. The signal processor also has additional control inputs for computer control of various functions via a standard RS-232 serial port and GPI/TALLY connector. The signal processor is operable to process the audio and video input signals and simultaneously display video images, waveform, vector and audio information in high resolution form, each in a quadrant of standard SVGA computer monitor in 800×600 pixel resolution.

FIG. 1 is a block diagram illustrating circuitry for the analog and digital inputs for receiving analog and digital video input signals, respectively. The analog and/or video input signals are processed to extract a horizontal sync signal and a vertical sync signal. These sync signals are utilized by the signal processor for the generation of various timing signals. For analog video inputs, red minus luminance (R-Y), blue minus luminance (B-Y), composite video (VIDORCAL) and CHROMAFIL signals are produced for use as source signals for generation of waveform or vector display. For digital video inputs Y, Cb, Cr, R, G, B, R-Y, B-Y, composite video (VIDORCAL) and CHROMAFIL signals are produced for use as source signals for generation of waveform or vector display.

Analog REF input 10 is coupled to input amplifier 12. One of analog NTSC/PAL input A, 14, and analog NTSC/ PAL input B, 16, are selected by the input select switch 18 which is user controllable via the front panel (not shown). The selected analog NTSC or PAL input is coupled to input amplifier/DC restore circuit 20 which is operable to DC restore based on the state of the clamp on/off signal which also originates from user controllable front panel controls (not shown). Thus, the selected NTSC/PAL input signal is DC restored under user control.

The REF select switch 22 selects the between the REF input and one of analog NTSC/PAL inputs A and B for subsequent processing into horizontal sync, vertical sync, red minus luminance and blue minus luminance signals. The selected REF signal is coupled to DC restore circuit 24 and accordingly is always DC restored. The DC restored REF output 26 is routed to sync separator 28 for generation of horizontal sync and vertical sync signals and to subcarrier regeneration circuit 30, subcarrier phase shifter 32 and chroma demodulator 34 for generation of red minus luminance (R-Y) and blue minus luminance (B-Y) signals which are subsequently amplified as shown by block 36.

The analog video input signal as selected by input select switch 18 is also routed to SC/H phase measurement circuit 37 for measurement of subcarrier to horizontal phase relationship. The output of the SC/H phase measurement circuit 37 is coupled to the microprocessor (FIG. 3) for subsequent processing and/or display. For NTSC video, SC/H represents the phase relationship of the subcarrier to the leading edge of horizontal sync. SC/H phase is correct when the zero crossing of subcarrier is aligned with the 50% point of the leading edge of sync. For PAL video signal, SC/H phase is defined as the phase of the EU component of the color burst extrapolated to the half amplitude point of the leading edge of synchronizing pulse of line 1 of field 1.

One of serial digital video input C, 38, and serial digital input D, 40, are also selected by input select switch 18. The selected serial digital video input signal used to generate horizontal sync and vertical sync signals for generation of subsequent timing signals. Y Cb Cr signals from which RGB, gamut error signals, red minus luminance and blue minus luminance as well as the composite video signals are derived, are used as input signals for the generation of waveform and/or vector display.

Figure 3:
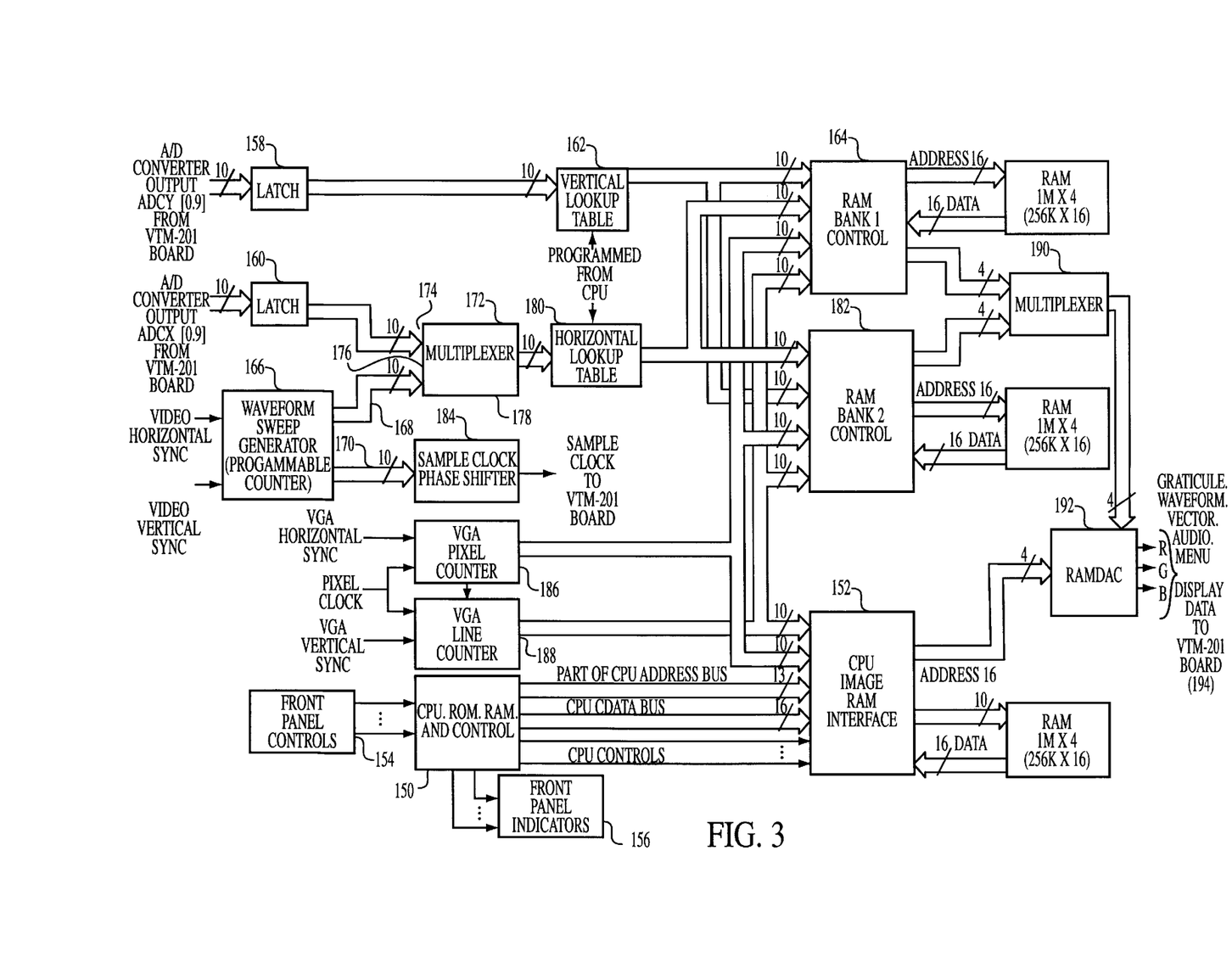
FIG. 3 is a block diagram of a dual RAM bank, waveform sweep generator, dedicated digital processor and associated circuitry in accordance with the invention

The selected serial digital input is coupled to a serial digital receiver 42 which locks to the serial data stream and generates separate data and clock signals which are routed to a serial digital decoder 44 and EDH coprocessor 46. The EDH coprocessor detects EDH and data errors and communicates these to the CPU (FIG. 3). The 10-bit parallel output of the EDH coprocessor is separated by 4 10-bit registers. The digital register outputs are converted into analog Y Cb CR format via triple 10-bit digital to analog converter 50. The Y Cb Cr format signal is input to filters 52 and to YCbCr-to-RGB transcoder 54, which converts the Y Cb Cr signal to RGB. The Y Cb Cr and RGB signals are subsequently amplified as shown by block 36. The RGB signal is input to a Gamut error detection circuit which produces a Gamut error signal 58, which is coupled to the microprocessor (FIG. 3) for subsequent processing and/or display.

The EDH coprocessor output is also routed to a digital video to composite encoder 60 which generates horizontal and vertical sync signals as well as a composite video signal. The input select switch selects between composite video originating from analog video inputs A or B and digital video inputs C or D and the resulting composite video signal is shown on FIG. 1 by reference number 62. Composite video signal 62 is also input to a chroma filter (bandpass filter, Fsc=3.58 mhz-NTSC, 4.43 mhz-PAL) for generation of the CHROMAFIL signal which is also input to amplifier block 36.

For purposes of calibration the CAL pulse calibration signal 68 is provided and can be switched in place of the composite video signal by calibration switch 70. The VIDORCAL signal 72 is output from the calibration switch and represents composite video from one of the analog or digital video inputs, depending on the state of the input select switch, or the CAL pulse calibration signal. The resultant VIDORCAL 72 signal is input to amplifier block 36.

For analog video inputs, the R-Y, B-Y, composite video (VIDORCAL) and CHROMAFIL signals are available on the output of amplifier block 36 for use as source signals for generation of a waveform or vector display. For digital video inputs the Y, Cb, Cr, R, G, B, R-Y, B-Y, composite video (VIDORCAL) and CHROMAFIL signals are available on the output of amplifier block 36 for use as source signals for generation of a waveform or vector display.

The waveform source switch 74 selects between the Y Cb Cr R G B VIDORCAL and CHROMAFIL source signals for subsequent waveform display as the signal Y (Y axis). The vector source switch 78 selects between the Cr, Cb signals and the R-Y, B-Y signals for subsequent vector display as the signals X (76) and Y (78) (X and Y axis). Lowpass filter 82, 2.5× amplifier 84 and attenuators 86, 88 adjust the source signals under user control via front panel switches (not shown).

FIG. 1 also shows 10 bit A/D converters 90 and 92 for analog to digital conversion of the X and Y signals 76, 78 respectively. Offset circuits 94 and 96 provide an offset adjustment of the X and Y signals under user control via front panel switches (not shown). The digital output of A/D converters further processed into waveform and vector display as set out in detail below.

FIG. 2 shows a block diagram of the circuitry for converting composite video signal 62 (interlaced) into a non-interlaced video image (either a full screen image or a rasterized video image), as well as the circuitry for outputting a non-interlaced video image in accordance with the invention. Composite video signal 62 is input to a NTSC/PAL-to-YUV decoder 98 (NTSC/PAL to Digital Components) which digitizes the signal and produces parallel digital Y and time multiplexed UV outputs along with associated timing and control signals. The output of the NTSC/PAL-to-YUV decoder 98 is coupled to a video line doubler 100 and associated 256K×8 memory chips which convert the YUV signals from interlaced to non-interlaced format (progressive scan). The output of the video line doubler 100 is 8 bit parallel data representing red, green and blue portions of the video image in RGB format.

The output of the video line doubler 100 is input to a resizing engine 102 which produces individual picture elements (pixels) for display on a non-interlaced video monitor. Each pixel consists of an R, G and B value each being 8-bits in size (24-bit color) which allows for $2^{24}$ possible colors. Each color pixel data is stored in one of two RAM buffers (Red—104 and 110, Green—106 and 112, Blue 108–114) which are controlled by 17-bit counters 116 and 118. Timing signals for 17-bit counters 116 and 118 are provided by a phase locked loop 120 which is synchronized to the analog or digital video input signal as selected.

The outputs of the RAM buffers 104–114 are coupled to octal registers 122–132 which feed triple D/A converter 134. The output of triple D/A converter 134 is filtered and clamped as shown by block 136 to produce a non-interlaced video image 138 in RGB format. The non interlaced video image 138 is resized by the resizing engine for display in one quadrant of a standard SVGA monitor at 800×600 resolution. In the alternative, the output of the video line doubler is coupled directly to the triple D/A converter 134 for generating a full screen video image as shown by dotted line 140, when so selected by the user.

FIG. 2 also shows the block diagram of the phased locked loop 120 which generates several of the timing signals used in conjunction with the display of video images, waveform, vector and audio information in accordance with the invention. First and second voltage controlled oscillators (VCOs) are provided for generating an accurate clock signal synchronized to the selected input. The first VCO 142 is used for NTSC or digital 525/60 operation, and the second VCO 144 is used for PAL or digital 625/50 operation. One of the VCOs is selected for use depending on the type of video input signal that has been selected. The selected VCO becomes part of the phase locked loop having a timing PLD 146 and a phase comparator and filter circuit 148. The output of the selected VCO is counted down and is locked to horizontal sync (HS). The synchronized pixelclk signal becomes the timing source for various circuitry in accordance with the invention including the VGA horizontal and vertical sync signals (vgahsync and vgavsync), and pictime, which determines where on the display the picture appears.

FIG. 3 shows the block diagram of the circuitry for generation of waveform, vector and audio graphic display information such as a bar graph as well as graticule and menu information for display on the VGA monitor as controlled by a microcontroller system having a microprocessor 150 with associated ROM, RAM, control circuitry for generating control signals, data and address busses and CPU image RAM interface 152. The status of the front panel controls 154 are input to the microprocessor 150 though I/O ports or the like. The microprocessor is coupled to front panel indicators 156 so that the front panel indicators can be controlled by the microprocessor.

The final image that the circuitry shown in FIG. 3 generates is the result of two sources. The first source consists of two RAM banks which store information pertaining to the waveform and vector signals based on the data received from 10 bit A/D converters 92 and 90 (digitized X and Y signals) as shown in FIG. 1. The second source consists of a third RAM bank which stores CPU generated image data such as screen text, graticules and an audio graphic display.

Data from 10 bit A/D converters 92 and 90 (digitized X and Y signals) is input to latches 160 and 158 respectively. The digitized Y signal is input to vertical lookup table 162 and the resulting table output is stored in RAM Bank 1 (164). Horizontal and vertical sync signals are input to programmable waveform sweep generator 166 which has first and second outputs 168 and 170. Multiplexer 172 having first and second inputs 174 and 176 is provided to switch between the digital X signal and the first output of the programmable waveform sweep generator 168. The digitized X signal from latch 160 is coupled to multiplexer input 174. The first output of the programmable sweep generator 168 is coupled to the second multiplexer input 176. Multiplexer output 178 is input to horizontal lookup table 180 and the resulting table output is stored in RAM Bank 2 (182). The second output of the programmable sweep generator 170 is coupled to a sample clock phase shifter 184 and the resulting output sample clock signal is coupled to the PAL/NTSC input of the phase locked look shown in FIG. 2.

The vgavsync and vgahsync signals and the pixelclk signals from the phase locked loop are input to VGA pixel counter and VGA line counter 186 and 188 respectively. The outputs of the VGA pixel counter and VGA line counter are coupled to the CPU image RAM interface 152 and first and second RAM banks 164 and 182.

The output of first and second RAM banks 164 and 182 are output to multiplexer 190. The output of the CPU image RAM interface 152 and the output of multiplexer 190 are coupled to RAMDAC 192 which produces analog image information 194 in RGB (progressive scan) format.

Figure 4:
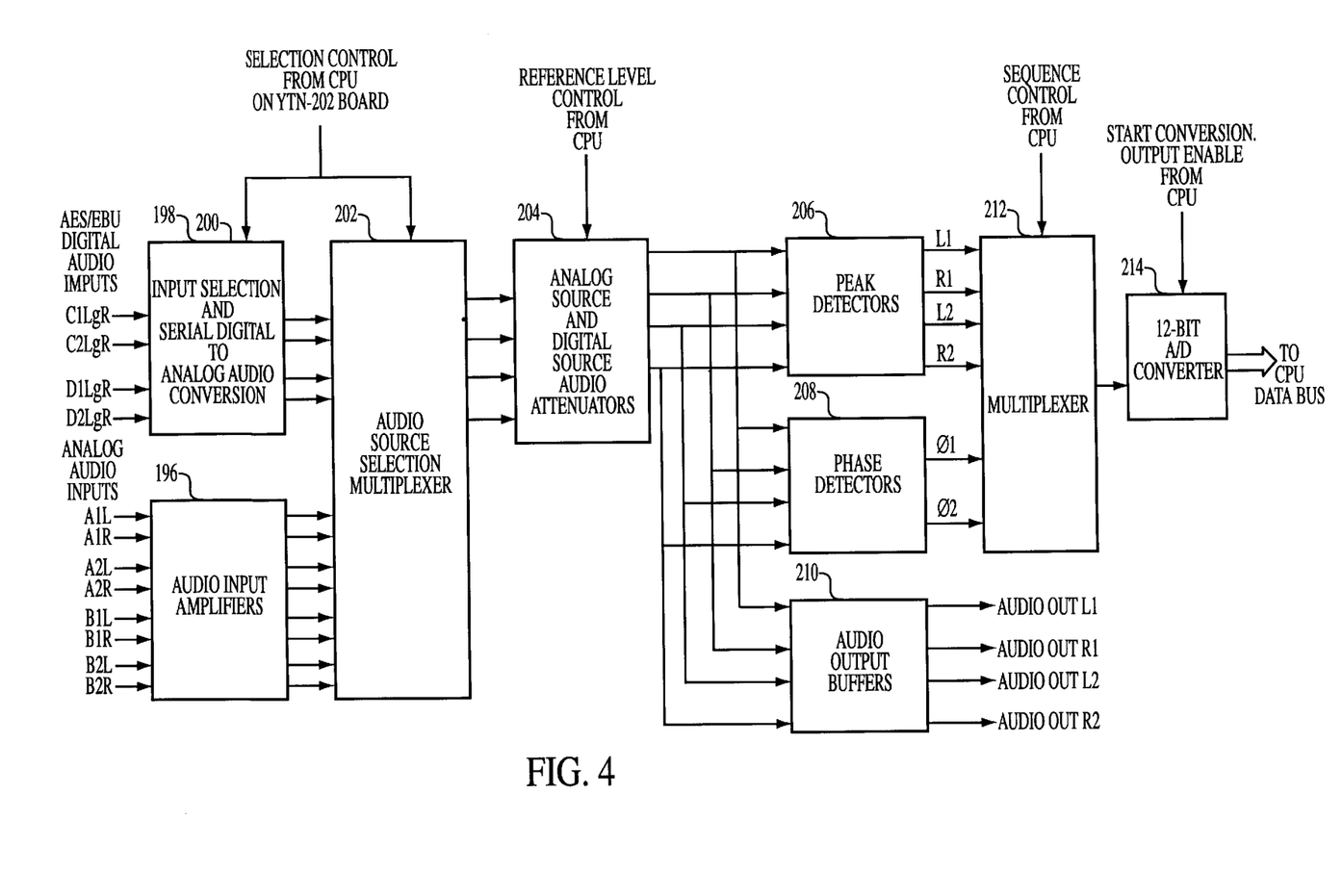
FIG. 4 is a block diagram of the audio input circuitry, peak detector and phase detector in accordance with the invention.

FIG. 4 shows a block diagram of the audio input circuitry, peak detector and phase detector in accordance with the invention. Analog audio inputs A1L, A1R, A2L, A2R, B1L, B1R, B2L and B2R are coupled to audio input amplifiers 196. The digital audio input signals have left and right audio multiplexed in a single signal. Accordingly, digital inputs C1L&R, C2L&R, D1L&R and D2L&R are coupled to an input selection multiplexer 198 (selected via front panel controls) and to digital to analog converters 200. Two of the four input channels (A, B, C or D) are then selected via the audio source selection multiplexer 202. The audio source selection multiplexer is coupled to attenuators 204 (selected via front panel controls). The output of the attenuators are coupled to peak detectors 206, phase detectors 208 and audio output buffers 210. The outputs of the peak detectors 206 and phase detectors 208 are coupled to multiplexer 212 and subsequently 12 bit A/D converter 214. The digitized peak and phase data from the 12 bit A/D converter is coupled to the microprocessor data bus and is used by the microprocessor to generate audio bar graphs with peak signal displays as well as phase information displays.

In operation the circuitry shown in FIG. 1 processes analog and digital video inputs signals and produces red minus luminance (R-Y), blue minus luminance (B-Y), composite video (VIDORCAL) and CHROMAFIL signals for analog video inputs as well as Y, Cb, Cr, R, G, and B for digital inputs. These signals are digitized by A/D converters 90 and 92 and are subsequently used as source signals for generation of waveform and/or vector display.

The circuitry shown in FIG. 3 receives the digitized source signals and generates image information for display of the vector and waveform information under the control of microprocessor 150 generally using waveform sweep generator 166 lookup tables 162, 180 and first and second RAM banks 164 and 182. The resulting vector and image information is multiplexed through RAMDAC 192 and is combined with microprocessor-generated graticule and menu data via CPU image RAM interface 192. The microprocessor 150 is operable to read front panel controls 154, selectively control the associated circuitry and control front panel indicators 156 to provide information to the user.

Video image information is generally processed by the circuitry shown in FIG. 2 as controlled by microprocessor 150. Interlaced video image information is processed by video line doubler 100 in order to convert to non-interlaced format. If the resulting image is to be displayed in a quadrant of the SVGA monitor, the output of the video line doubler is coupled to resizing engine 102, RAM buffers 104–114 and octal registers 122–132. The resulting video image is then converted from digital to analog via triple D/A 134, filtered and multiplexed with the analog image information 194 (FIG. 3) via switch 216 as controlled by the pictime signal (from phase locked loop 120).

Audio signal processing is performed by the circuitry shown in FIG. 4 in conjunction with microprocessor 150. Digital audio input signals converted to analog and are input to audio source selection multiplexer 202. Analog input signals are amplified and are also input to audio source selection multiplexer 202. The selection of the particular audio source for generation of bar graph information is accomplished via front panel controls as controlled by microprocessor 150. User controls are also provided for optional attenuation based on front panel controls. The selected audio information is then input to peak detectors 206 and phase detectors 208 for generation of at least one peak value and phase difference value. The selected audio information (analog), peak value and phase difference value are then digitized by A/D converter 214 for input to microprocessor 150. The microprocessor then constructs audio graphic display information for display via RAMDAC 192 (FIG. 3).

The video output 218 is designed specifically to drive a super VGA (SVGA) progressive scan (i.e. non-interlaced) computer monitor at a resolution of 800 pixels per line by 600 lines per frame, at frame rates of 59.94 Hz for NTSC inputs, and 50 Hz for PAL inputs. These rates match the vertical frame rates of the respective standards. The result of using 800×600 resolution is a video and graphic display of hitherto unachieved clarity of detail for television images, rasterized waveforms, rasterized vectorscope representations, bar graph audio level meters, and the text and graticules that accompany these. Because of the widespread and increasing usage of personal computers, abundant and low cost monitors compatible with the invention are available and in accordance with the invention produce a very precise and readable display of video and audio information.

Figure 5:
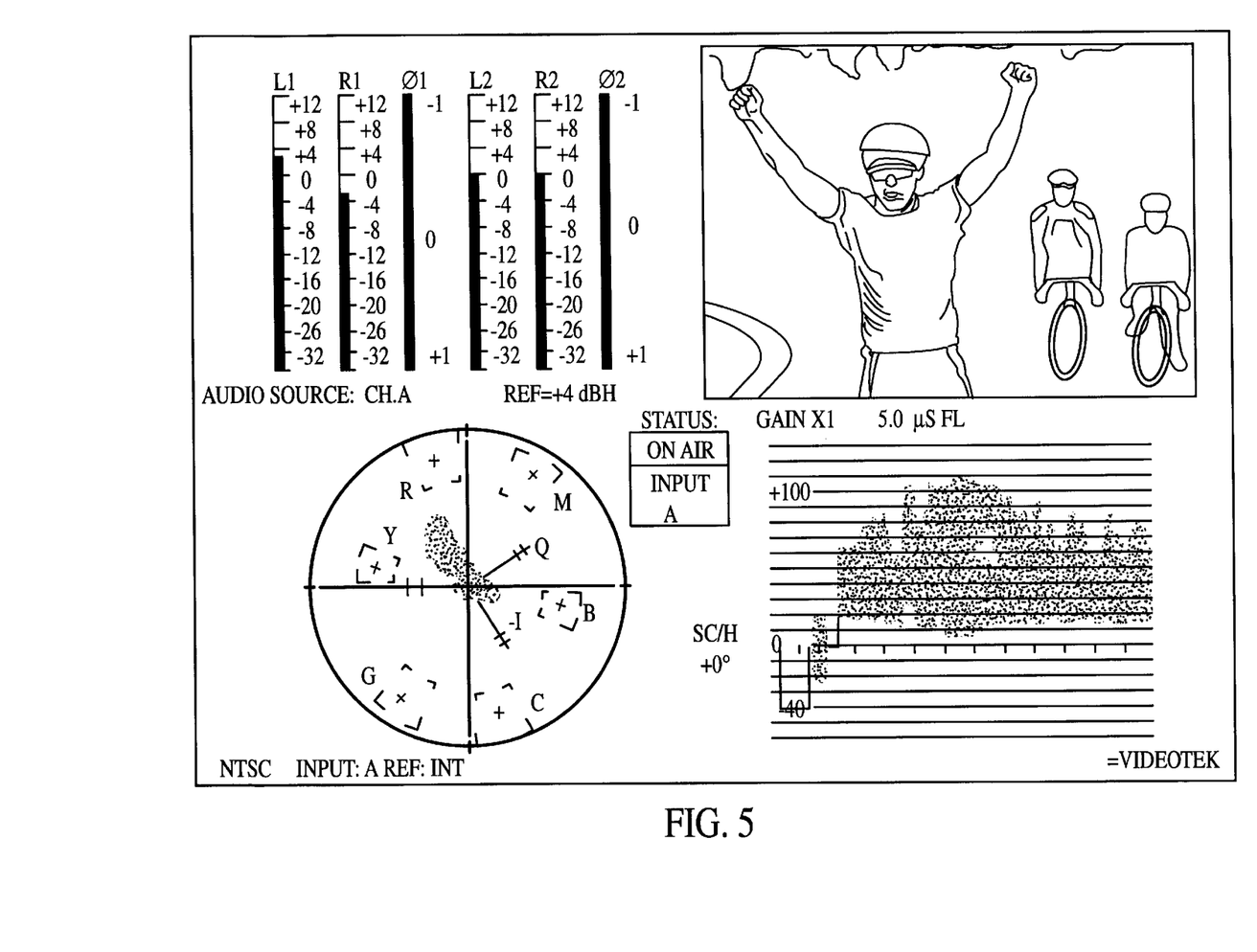
FIG. 5 is a pictorial diagram showing simultaneous display of a video image, waveform, vector and audio graphic display information in high resolution form, each in a quadrant of standard computer monitor.

FIG. 5 shows the simultaneous display of a video image, waveform, vector and audio graphic display information in high resolution form, each in a quadrant of standard computer monitor 228. In a preferred selected mode the invention displays the resized, full motion video picture 220 carried by the selected video input in the upper right quadrant of the SVGA monitor; the real time waveform 222 in the lower right quadrant including graticules and voltage level labels; the vectorscope representation of the signal 224 in the lower left quadrant including labelling and markings for a standard color bar test signal, and the audio graphic display 226 (bar graph) of the audio levels of 2 selected stereo pairs and their phase differences in the upper left quadrant. Alternatively, the user can select a full screen view of the video image, waveform, vectorscope or audio graphic display information.

For the selected waveform, the invention provides for user selection of: vertical gain of one or 2.5; zoomed displays around the 0 IRE region and around the 100 IRE region, horizontal magnification of one or five; 1H, 2H, 1V, and 2V displays; the display and identification of just one individually selected line out of the entire NTSC/PAL frame; flat, low pass, and chroma filtering of the displayed waveform; and horizontal and vertical positioning of the waveform with respect to its graticule via front panel H and V waveform position controls.

For the vectorscope display, the invention provides for user selection of: rotation of the display through 360° via a front panel VECTOR PHASE control; zoomed views of each of the four quadrants of the vector display plus a center zoomed view; for digital inputs, display of component vectors or composite vectors, for PAL, display of normal or NTSC overlaid modes; allowance for 75% and 100% color saturation; horizontal and vertical positioning of the vectorscope display with respect to its graticule; and graticules that include targets for standard color bar test patterns.

For the audio display, the invention provides for user selection of: audio level and phase difference display of 2 stereo pairs selected from among 4 input analog stereo pairs and 4 input AES/EBU standard serial digital stereo pairs; selection of one of 4 wide dynamic range measurement scales calibrated in dB; reference levels for 0 dB of 0, +4, +6, +8, and +12dBm for analog inputs, and −22, −20, −18, and −16 dBfs for digital inputs; a display zoomed around 0 dB; and normal, peak, and peak hold displays with choice of bar graph display ballistics (equivalent to galvanometer meter damping control). The audio display preferably also utilizes colors such as green, yellow, and red in display regions on the audio level bar graphs to warn the user of excessive levels. The invention is operable to display an audio phase difference measurement based on the low pass filtered output of "exclusive-or" of hard limited audio signals.

For the entire display, the invention provides for user selection of background color, waveform color, vectorscope color, and graticule color. Front panel controls allow for user control of various display and selection modes. The invention provides an on-screen setup menu allowing the user to choose, and set values for lesser used functions and conditions.

The microprocessor automatically changes the graticules as appropriate for the display selected by the front panel controls. For NTSC/PAL inputs, a measurement of leading edge of horizontal sync to subcarrier phase (SC/H phase) also is displayed on the SVGA monitor. For serial digital video inputs, the SVGA monitor displays the presence, absence or erred condition of EDH, input signal DATA errors, and GAMUT errors in the input stream.

Additional control can be exercised through the use of a computer keyboard interface, a PC compatible RS-232 serial port, and a GPI/TALLY connector.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A signal processor for use with a standard non-interlaced computer monitor comprising:
   at least one video input for receiving a video input signal in at least one of an analog format and a digital format;
   means for generating a resized non-interlaced video image based on the video input signal;
   a dedicated digital processor and associated RAM, ROM and control logic;
   a dual RAM bank in communication with the digital processor for storing information representing at least one of a graphic video waveform and a vector diagram;
   first and second A/D converters;
   a waveform sweep generator;
   a vertical lookup table and a horizontal lookup table both having outputs in communication with the dual RAM bank;
   a two to one multiplexer having an output coupled to the horizontal lookup table, the first A/D converter having an output in communication with an input of the vertical lookup table, the second A/D converter having an output in communication with a first input of the 2 to 1 multiplexer, the waveform sweep generator having an output in communication with a second input of the 2 to 1 multiplexer, wherein the first A/D converter is operable to digitize information representing a y-axis of at least one of the graphic video waveform and vector diagram, and the second A/D converter is operable to digitize information representing an x-axis of at least one of the graphic video waveform and vector diagram, the dual RAM bank being operable to store the digitized information representing the y-axis and x-axis graphic video waveform and vector diagram, the digital processor being operable to control the outputting of information stored in the dual RAM bank for display of the graphic video waveform and vector diagram;
   means for generating an output for simultaneously displaying at least two of the resized non-interlaced video image, graphic video waveform and vector diagram in progressive scan format, each in a portion of the standard non-interlaced computer monitor.

2. The signal processor of claim 1, further comprising:
   at least one audio input for receiving an audio input signal in at least one of an analog format and a digital format;
   means for generating an audio graphic display based on the audio input signal; and
   wherein the means for generating an output for simultaneously displaying said at least two of the resized non-interlaced video image, graphic video waveform and vector diagram is further operable selectively to display the audio graphic display.

3. The signal processor of claim 2 wherein the means for generating the audio graphic display comprises a peak detector and a third A/D converter both in communication with the audio input signal, the peak detector being operable to generate a peak value based on the audio input signal, the third A/D converter being in communication with the digital processor and being operable to convert the audio input signal and peak value into a digital format, the digital processor being operable to generate an audio graphic display based on the audio input signal and peak value.

4. The signal processor of claim 2 wherein the audio input signal is a stereo audio input signal having a left and right channel and the means for generating the audio graphic display comprises a peak detector, a phase detector and a third A/D converter all three in communication with the audio input signal, the peak detector being operable to generate a peak value based on the audio input signal, the phase detector being operable to generate a phase difference value measured between the left and right channel of the audio input signal, the third A/D converter being in communication with the digital processor and being operable to convert the audio input signal, peak value and phase difference value into a digital format, the digital processor being operable to generate an audio graphic display based on the audio input signal peak value and phase difference value.

5. The signal processor of claim 2 wherein the audio signal processor is operable to simultaneously display the resized non-interlaced video image, graphic video waveform, vector display and audio graphic display in progressive scan format, each in a quadrant of the standard non-interlaced computer monitor.

6. The signal processor of claim 1 wherein the means for generating the resized non-interlaced video image comprises a NTSC/PAL to Digital Components decoder in communication with a video line doubler in communication with a resizing engine, the video input signal being in communication with an input of the NTSC/PAL to YUV decoder, the resizing engine having an output for data representing the resized non-interlaced video image in communication with the means for generating an output.

7. The signal processor of claim 1 wherein the means for generating the resized non-interlaced video image comprises a NTSC/PAL to Digital Components decoder in communication with a video line doubler in communication with a resizing engine, the video input signal being in communication with an input of the NTSC/PAL to YUV decoder, the audio-video processor having an output multiplexer having inputs in communication with an output of the resizing engine and the dual RAM bank, the digital processor being operable to control the output multiplexer to select between the information stored in the dual RAM bank for output of the graphic video waveform and vector diagram, and the resizing engine for output of the resized non-interlaced video image on the standard non-interlaced computer monitor.

8. A signal processor for use with a standard non-interlaced computer monitor comprising:

at least one video input for receiving a video input signal in at least one of an analog format and a digital format;

means for generating a resized non-interlaced video image based on the video input signal;

at least one audio input for receiving an audio input signal in at least one of an analog format and a digital format;

means for generating an audio graphic display based on the audio input signal;

a dedicated digital processor and associated RAM, ROM and control logic, a dual RAM bank in communication with the digital processor for storing information representing at least one of the graphic video waveform and vector diagram, and a third RAM bank in communication with the digital processor for storing data representing graticule information, audio graphic display information and menu information, the digital processor being in communication with the means for generating the resized non-interlaced video image and being operable to control the outputting of information stored in the dual RAM bank, third RAM bank for simultaneous display of the resized non-interlaced video image, graphic video waveform, vector diagram, audio graphic display, graticule information and menu information in progressive scan format, each in a quadrant of the standard non-interlaced computer monitor; and means for generating an output for simultaneously displaying at least two of the resized non-interlaced video image, graphic video waveform, vector diagram and audio graphic display in progressive scan format, each in a portion of the standard non-interlaced computer monitor.

9. The audio-video signal processor of claim 8 wherein the means for generating the non-interlaced video image comprises a NTSC/PAL to YUV decoder in communication with a video line doubler, the video input signal being in communication with an input of the NTSC/PAL to Digital Components decoder, the video line doubler having an output for data representing the non-interlaced video image in communication with the digital processor, the digital processor being operable to control the outputting of data from the video line doubler for output of the non-interlaced video image on the standard non-interlaced computer monitor.

10. The audio-video signal processor of claim 8 wherein the means for generating the non-interlaced video image comprises a NTSC/PAL to YUV decoder in communication with a video line doubler in communication with a resizing engine, the video input signal being in communication with an input of the NTSC/PAL to Digital Components decoder, the audio-video processor having an output multiplexer having inputs in communication with an output of the resizing engine and the dual RAM bank, the digital processor being operable to control the output multiplexer to select between the information stored in the dual RAM bank for output of the graphic video waveform and vector diagram, and the resizing engine for output of the non-interlaced video image on the standard non-interlaced computer monitor.

11. The audio-video signal processor of claim 8 wherein the means for generating the audio graphic display comprises a peak detector and a third A/D converter both in communication with the audio input signal, the peak detector being operable to generate a peak value based on the audio input signal, the third A/D converter being in communication with the digital processor and being operable to convert the audio input signal and peak value into a digital format, the digital processor being operable to generate an audio graphic display based on the audio input signal and peak value.

12. The audio-video signal processor of claim 8 wherein the audio input signal is a stereo audio input signal having a left and right channel and the means for generating the audio graphic display comprises a peak detector, a phase detector and a third A/D converter all three in communication with the audio input signal, the peak detector being operable to generate a peak value based on the audio input signal, the phase detector being operable to generate a phase difference value measured between the left and right channel of the audio input signal, the third A/D converter being in communication with the digital processor and being operable to convert the audio input signal, peak value and phase difference value into a digital format, the digital processor being operable to generate an audio graphic display based on the audio input signal peak value and phase difference value.

13. The audio-video signal processor of claim 8 wherein the audio signal processor is operable to simultaneously display the non-interlaced video image, graphic video waveform, vector display and audio graphic display in progressive scan format, each in a quadrant of the standard non-interlaced computer monitor.

* * * * *